3,470,024
RECOMBINATION SYSTEMS FOR SEALED
BATTERIES AND BATTERIES INCOR-
PORATING THEM
James H. B. George and Albert E. Dennard, Cambridge,
and Ekkehard L. Kreidl, Wayland, Mass., assignors to
Arthur D. Little, Inc., Cambridge, Mass., a corporation
of Massachusetts
Filed Dec. 30, 1966, Ser. No. 606,418
Int. Cl. H01m 35/00
U.S. Cl. 136—6     3 Claims

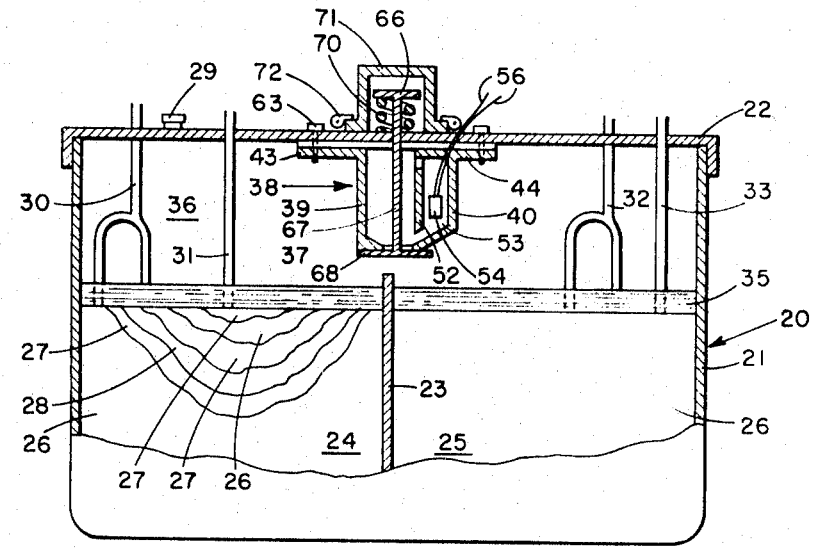
Fig. 1
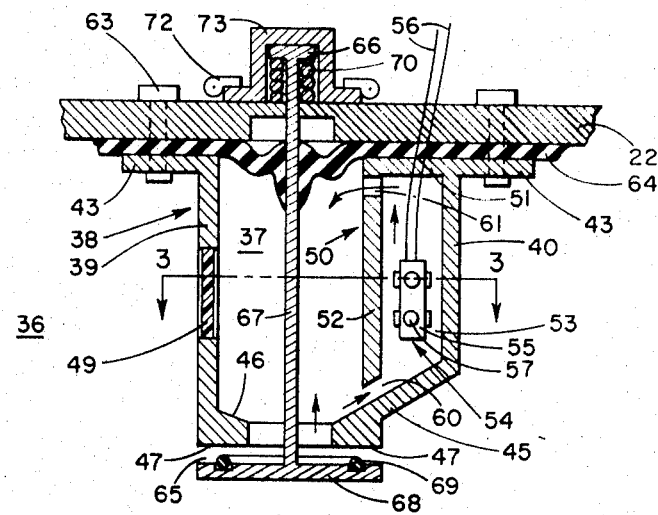
Fig. 2
Fig. 3
James H. B. George
Albert E. Dennard
Ekkehard L. Kreidl
INVENTORS
BY
Attorney

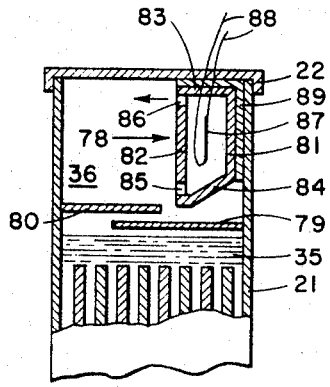
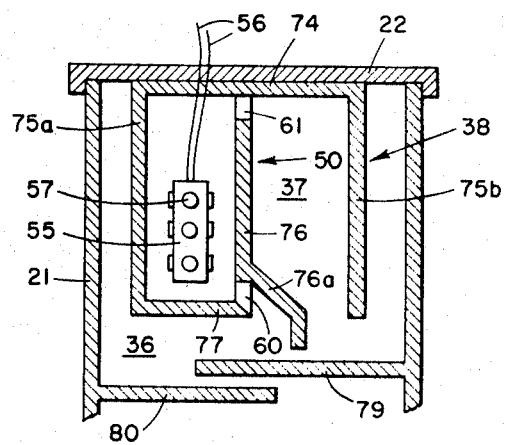
Fig. 4
Fig. 5
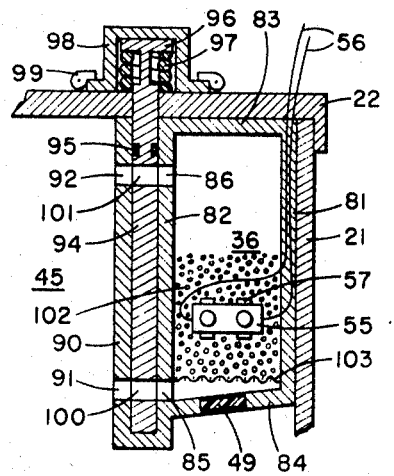
Fig. 6
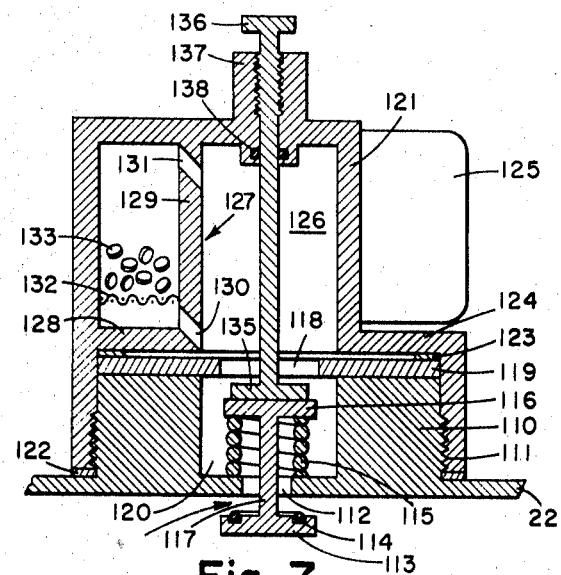
Fig. 7
James H. B. George
Albert E. Dennard
Ekkehard L. Kreidl
INVENTORS
Attorney James H. B. George
Albert E. Dennard
Ekkehard L. Kreidl
INVENTORS United States Patent Office 3,470,024
Patented Sept. 30, 1969

ABSTRACT OF THE DISCLOSURE

This invention relates to sealed batteries, and more particularly to sealed secondary or rechargeable batteries which evolve hydrogen and/or oxygen gases especially during the time when they are being charged. A recombination system, which includes a flue member, is incorporated into the battery to effect a reaction between the hydrogen and oxygen and return the product water to the electrolyte.

In a copending application Ser. No. 606,419, filed Dec. 30, 1966, filed in our names we have disclosed a recombination system, for use with sealed secondary batteries, which affords protection for a recombination-effecting means and provides for its controlled periodic use.

It has long been known that the gases formed in secondary batteries build up pressure within the battery casing. This makes it necessary to permit at least a portion of these gases to escape. This, in turn, requires that water lost in the decomposition must be periodically replaced in the electrolyte. This fact has, in turn, somewhat limited the use of secondary batteries as power sources, even though there are many devices which could advantageously be powered by them. For example, certain industrial and domestic power tools and small portable household appliances and other devices could very conveniently be powered by secondary batteries except for the fact that these batteries cannot in general be formed into an essentially completely seated power pack as can the more expensive primary or dry-cell batteries. One method of solving the gassing problem in secondary batteries is to arrange the capacities of the electrodes so that, under normal conditions, oxygen alone is evolved at the anode. This oxygen can then be caused to be electrochemically reduced at the cathode. This technique was developed by Neumann (U.S. Patents 2,571,927 and 2,636,058) and has formed the basis for the development of sealed rechargeable nickel-cadmium and silver-cadmium batteries. It is, however, restricted to battery systems having alkaline electrolytes and cadmium cathodes. Such systems tend to have a higher cost and therefore more limited application than batteries based on the lead, lead dioxide couple.

It should be pointed out that the term "sealed battery" is used to designate a battery which normally does not vent gas, but which may have a safety or relief valve adjusted to release gas to the atmosphere when it has reached a certain specified level of pressure. Therefore, the term is used hereinafter to designate a battery which will not normally vent any gas to the atmosphere and which can operate over long extended periods of time without maintenance and without the need for adding water to the electrolyte.

Other approaches to the problem of making sealed secondary batteries have included providing means for recombining, within the battery, at least a portion of the hydrogen and oxygen gases to form water and for returning the product water to the electrolyte. This has been done generally by including in the battery housing a catalyst or a hot wire to effect the recombination of that portion of the gases which could readily react. In many of the arrangements the remaining uncombined gasses are vented from the battery casing to the atmosphere. It has been realized in the prior art devices that it is necessary to protect whatever catalyst is used from the corrosive effects of the electrolyte, e.g., a strong alkaline liquid or an acid, such as sulfuric acid. This has been done by enclosing the catalyst in a labyrinthian arrangement (U.S. Patent 2,465,202) or by using narrow passageways which were essentially gas-permeable but liquid-impermeable. Another approach to the problem has been to gel the electrolyte. These approaches to the problem of catalyst protect are, however, not completely satisfactory solutions, for the constant tipping of such batteries, shaking, or mishandling can result in bringing a liquid electrolyte in contact with the catalyst surface. Moreover, batteries having a gelled electrolyte frequently have attenuated lifetimes.

Early in the prior art work on recombination it was realized that hydrogen and oxygen were not always produced in a stoichiometric ratio in the decomposition which occurred during charging. This fact, in turn, has resulted in the use of relatively complicated equipment to solve the problem of this possible imbalance in gas proportions. As an example, one system proposed as a solution of the problem requires the incorporation of a relatively complex and expensive auxiliary electrode into the battery along with its associated circuitry. The purpose of the auxiliary electrode is automatically to generate within the battery whichever of the gases is in short supply and is needed to furnish a stoichiometric quantity. Such an electrode is described, for example, in U.S. Patent 2,578,027.

It has also been recognized that it would be highly desirable to protect the catalyst surface from the water which is formed, or to provide means for drying the catalyst surface (see for example U.S. Patent 2,465, 202). Thus heating the catalyst is part of the prior art teaching.

However, each of the prior art devices has apparently presented one or more problems of such a serious nature that it has not been found practical to make a safe, sealed battery which may be used for a wide range of applications, despite the fact that there is a real need for such a battery.

BRIEF SUMMARY

This invention provides a recombination system for use with a sealed secondary battery. The system is such that the hydrogen and oxygen gases are effectively combined and the product water is returned to the electrolyte. Although this recombination system will normally be incorporated within the battery housing, it may, if desired, be external of it. The recombination system includes a flue member having a lower gas inlet and an upper gas outlet and containing therein a catalyst or a hot wire. The catalyst may be heated, and the flue member may itself be contained within an enclosure. The flue member or enclosure may have means for controlling the onrush of gases to contact the catalyst or hot wire. In preferred embodiments externally-actuated means are provided to control the passage of gases into the flue member, normally during charging.

It is therefore a primary object of this invention to provide a sealed secondary battery which may remain sealed throughout its useful life and require no maintenance or additional quantities of electrolyte. It is another obect of this invention to provide a battery of the character described which is relatively simple and inexpensive to construct. It is another object of this invention to provide a battery of the character described which may be made in a number of different forms and in a wide size range. It is still another object of this invention to provide a sealed secondary storage battery which may be used in a number of applications not presently considered possible for secondary batteries. It is still another object to provide such a battery which is safe to use in any desired orientation, even if it is to be inverted, shaken or otherwise mishandled in use. Other objects of the invention will in part be obvious and will in part be apparent hereinafter.

The invention accordingly comprises the features of construction, combination of elements and arrangement of parts which will be exemplified in the constructions hereinafter set forth; and the scope of the invention will be indicated in the claims.

Contrary to the previous belief that a sealed secondary battery had to have the amount of hydrogen and oxygen maintained in stoichiometric ratios or be so designed as to be able to vent the excess of one or the other of these gases to the atmosphere we have found that if a battery casing is made to withstand reasonable pressures over the range of about 25 to 60 p.s.i.g. or more (depending upon use and desired lifetime) there need not be any adjustments made in the relative quantities of hydrogen and oxygen within the battery so long as there is an efficient recombination system present. Rather, during the course of operation, the equilibrium will shift back and forth such that over a period of time the amounts of these two gases are adjusted to essentially stoichiometric ratios. Thus, we have found that it is not necessary to provide an auxiliary electrode to adjust the stoichiometry of the system, although one may be desirable in specific battery constructions.

We have found, however, that efficient recombination can be achieved by positioning a suitable recombination-effecting member (e.g., a catalyst or a hot wire) within a flue-like structure, hereinafter called a "flue member." Through the use of this structure within the battery casing, or in fluid communication with the interior of the battery, we can control the flow of the gases to obtain maximum contact with the recombination-effecting member; and hence we achieve optimum conditions within the battery for the recombination of hydrogen and oxygen to form water vapor which is subsequently condensed and returned to the electrolyte.

The flue member may be incorporated in a chamber and the flow of gases into the chamber, and hence into the flue member, may be controlled. This is particularly desirable in batteries whch have a liquid electrolyte and which are to be subjected to tipping, inverting, shaking or other degrees of orientation. The chamber may then be opened only when the battery is in an upright position—a condition which precludes the flow of electrolyte onto the catalyst. If the flue member is located within a chamber and the chamber equipped with means to close it during discharge, it is essential to prevent any explosion which could be brought about when gas pressure, built up within a battery during discharge, is suddenly released into the recombination system by the opening of the valve. This can conveniently be done by providing suitable means for preventing the sudden onrush of gases to contact the recombination-effecting means. For example, the valve which controls the flow of fluid into the recombination system may be so designed and constructed as to limit the rate of fluid flow into the recombination system chamber until the pressures in the battery casing and in the chamber are approximately equal. If it is not convenient to use such a valve, or if an additional safety feature is desired, then suitable flash suppressing means may be placed in the flue member in association with the recombination-effecting means.

In place of, or in addition to, the use of flash-suppressing means or controllable valve means the chamber may be in fluid communication with the interior of the battery casing through a membrane (or other suitable device) which is gas permeable but fluid impermeable. Such an arrangement minimizes the pressure differential in the two volumes, thus eliminating the possible gas onrush problem. It will, of course be necessary to provide, along with the use of such membranes, suitable means for discharging the product water back into the electrolyte.

Although we do not wish to be bound by the theory offered in the following brief explanation, it is believed that the flue member of this invention establishes within the battery housing the conditions necessary for setting up a natural convection fluid flow pattern thus causing a near maximum portion of the hydrogen and oxygen gases which are to be recombined to come under the influence of the recombination-effecting means provided. Thus, by constructing a flue member around the recombination-effecting means, there is setup the necessary conditions for convective flow. The lower density, warmer gases which are next to the hot surfaces of the flue member move upward because of thermal and density gradients which exist between the warm gases and the high-density cooler gases which are farther away from the hot surfaces in the flue. These hot surfaces are normally the recombination-effecting means; and in a preferable embodiment external heat is applied to these means during charging when the system is most active. The reaction between hydrogen and oxygen is, of course, exothermic and thus in the recombination process heat is generated. This heat of reaction may or may not be sufficient to set up the desired convection flow pattern. However, it appears that within the flue member there is established the necessary density and temperature differences to set up the convective motion which sweeps the hydrogen and oxygen gases into the reaction zone. The gases which are not reacted are constantly recirculated so that in the process of its use the recombination system of this invention is continually and efficiently converting the electrolyte decomposition gases to water vapor which is carried out of the upper fluid outlet of the flue member as a gas. The gaseous water is then condensed in the colder atmosphere which surrounds the flue member, and the product water is then returned by gravity to the electrolyte.

For a fuller understanding of the nature and objects of the invention, reference should be had to the following detailed description taken in connection with the accompanying drawings in which:

FIG. 1 is a side elevational view, partly in cross section, of a typical secondary battery incorporating one embodiment of the recombination system of this invention;

FIG. 2 is an enlarged detailed cross section of the recombination system of FIG. 1;

FIG. 3 is a cross section of FIG. 2 taken along line 3—3 of that figure;

FIGS. 4 and 5 are cross sections through a battery showing embodiments of the recombination system which are continuously open to the battery chamber;

FIG. 6 is a cross section through part of the top of a secondary battery showing another modification of the recombination system having a flue member with externally actuatable valve means;

FIG. 7 is a cross section of a recombination system suitable for attaching externally of a battery;

Figure 8:
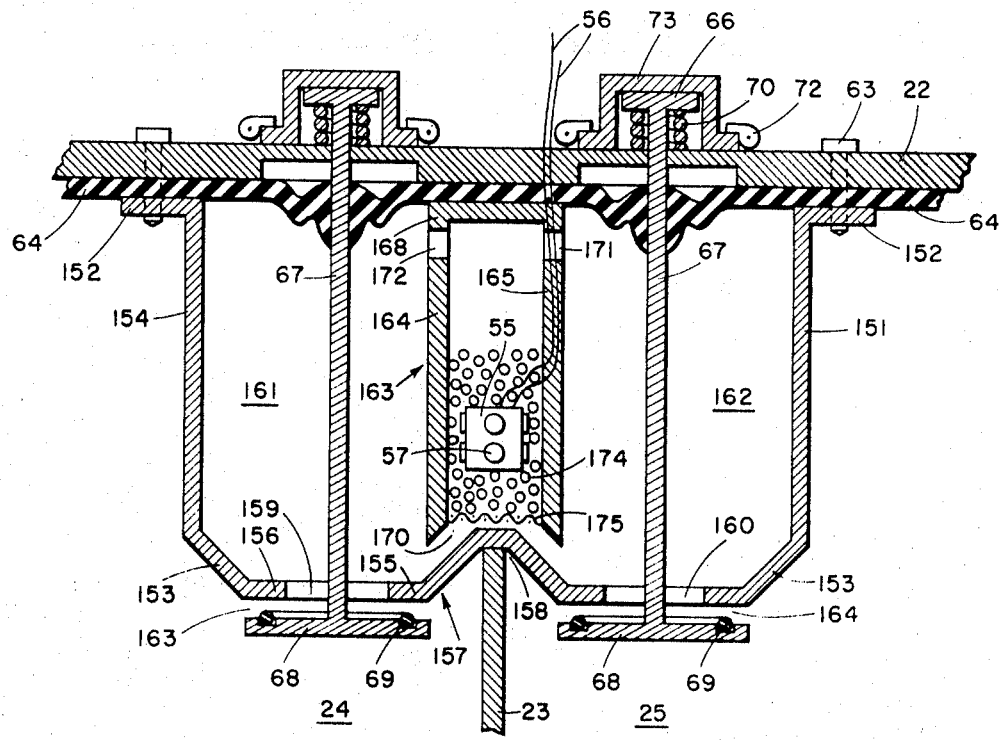
FIG. 8 is a cross section of a recombination system of this invention showing the application of a single flue member to multiple battery cells.

FIG. 1 illustrates how the recombination system of this invention may be incorporated in a typical lead-acid storage battery comprising two cells. It will be appreciated that many of the details, such as external electrodes, connecting members and the like, have been omitted from the drawing in FIG. 1 inasmuch as these are standard and not part of this particular invention. The battery is shown generally at 20, and it will be seen to be formed of a battery case or housing 21 having a fluid-tight cover 22. Normally, in such a battery the central divider 23 would extend to the cover thus isolating the two cells 24 and 25 to prevent the transfer of electrolyte from one cell to the other. However, in the modification shown in FIG. 1, a single recombination system of this invention is illustrated as serving both of the cells. In actual practice, if the electrolyte is a liquid, it would be desirable to have cells 24 and 25 isolated; and FIG. 8 to be described subsequently, illustratees an arrangement whereby the cells are isolated and a single flue member is used to serve both cells simultaneously. The arrangement of FIG. 1 would be satisfactory for a battery using a gelled electrolyte.

In accordance with standard practice there are fitted within the battery case a number of electrodes. Thus, FIG. 1 shows an arrangement comprising a negative electrode or plate 26, and separator 27, and then a positive plate 28. This arrangement may, of course, be repeated. A blow-out valve 29 is provided for safety to prevent fracturing of the casing if the pressure reaches too high a level. Also, in accordance with standard practice, there are associated with each of the cells electrode connectors which extend externally of the cover, electrode connectors 30 and 31 being associated with cell 24 and electrode connectors 32 and 33 being associated with cell 25. An electrolyte, liquid or gelled, 35 is added to a level slightly above the top of the plates.

According to this invention, there is provided in the volume 36, which is defined between the electrolyte level and the cover 22, a recombination system generally indicated by the numeral 38. This recombination system is shown in detail in FIG. 2, and reference should be had to FIG. 2 and the cross-sectional detail of FIG. 3 in conjunction with the description of FIG. 1. In the embodiment shown in FIGS. 1–3 the recombination system is contained within a chamber 37 which has an opening into volume 36 and an externally-actuatable valve means for controlling the flow of fluids into and out of the recombination system. Thus, in this embodiment it is possible to carry out the recombination of the gaseous oxygen and hydrogen at a selected period, e.g., during charging. The recombination chamber is formed of four walls 39, 40, 41, and 42, each having an outwardly extending flange such as flange 43 shown in FIGS. 1 and 2. One or more of these walls may have an inclined section, such as inclined section 45 of wall 40 and 46 of wall 39. The purpose of these inclined sections is to insure the ready return of comdensed water into the battery electrolyte. These inclined sections terminate at the bottom of the chamber in a flat surface, such as surface 47 which provides a suitable valve seat as is explained subsequently.

In the embodiment of FIGS. 1–3, the flue member, generally indicated by the numeral 50, is located on one side of the chamber 37. It is defined by a portion of walls, 40, 41 and 42, inclined section 45, and inwardly extending wall flange 51 and a flue wall 52. Within the flue member passage 53, there is positioned a recombination means which may be either a catalyst which is capable of catalyzing the reaction between gaseous hydrogen and oxygen or a heated wire. In FIGS. 1–3 this recombination means 54 is shown as a catalyst which is comprised of a resistor body 55, its associated electrical lead wires 56, and catalyst pellets 57 adhered to the resistor body surface. The resistor is formed of a suitable electrically conducting material capable of developing resistance heating, such as a carbon resistance element, and the catalyst possesses the necesary surface characteristics to catalyze the $2H_2+O_2$ reaction. Palladinized alumina pellets adhered to the resistor elements by an epoxy adhesive are particularly well suited for the purpose. Other catalysts such as platinum, rhodium, ruthenium and other members of the precious metals group may also be used.

The convective currents necessary to establish the gaseous flow pattern through the flue member require a lower gas inlet means, such as lower opening 60 (of which there may be more than one) and upper gas outlet means such as opening 61 (of which there may be more than one). It is preferable that the recombination means be positioned within the lower half of the flue member passage 53 and further that it occupy a major part of the cross-sectional area of the passage without, of course, effecting any appreciable pressure drop. This particular position insures the heating of the gases (through the heating element as well as through the exothermicity of the reaction between the hydrogen and oxygen) is a locality in the flue to maximize the convective currents.

The recombination system structure can conveniently be formed of a single piece of a molded plastic of a character which is not corroded by the battery environment. Although it is shown in FIGS. 1–3 to be rectangular in shape, the recombination system may be of any one of many different cross sections, including circular. The recombination system is conveniently affixed to the battery cover 22 through its top flanges by screws 63, or other suitable means. An elastomeric gasket 64 is interposed between the flanges and the cover to effect a pressure seal for the externally actuable valve means.

Fluid communication between the battery casing volume 36 and the recombination system chamber 37 is by way of fluid passage 65 (FIG. 2) when the valve is opened. The valve itself in this modification is one which comprises a pressure-applying member 66 located outside the battery and to which external force is applied to achieve valve actuation, a valve stem 67, and a bottom closing member 68 having, if desired, suitable sealing ring means such as an elastomeric O-ring 69. During those periods of time, e.g., during discharge, when the recombination system is to be isolated from the battery, the valve will be closed as shown in FIG. 1. This means that the closing member 68 is in contact with the surface 47 and that the seal made by the O-ring 69 is liquid-tight and also normally gas-tight. A spring 70 applies the necessary upward force to the pressure-applying member 66 to maintain the valve in its closed position. In order to prevent a premature opening of the valve through pressure on pressure-applying member 66, it is covered with protective cover 71 (FIG. 1) held in place by any suitable means such as catches 72. During those periods of time when the electrolyte is decomposing at a rate sufficient to require the use of the recombination system, e.g., during charge, the major portion of the hydrogen and oxygen gases which do not leak through membrane 49 are admitted to volume 37 by applying pressure to the pressure-applying member 66 to open fluid passage 65. This is conveniently done by removing protective cover 71 and inserting the external portion of the valve in a pressure-applying socket 73 (FIG. 2) installed on a charging rack and affixing it into position to maintain the valve in its open position while the battery is being charged. At the same time the valve is opened, the lead wires 56 are connected to an electrical source to heat the resistor element 55.

Inasmuch as it is necessary to prevent a sudden onrush of the hydrogen and oxygen gases against the surface of the recombination-effecting means it is necessary to provide means for accomplishing this. In the recombination system of FIG. 2 the means of preventing the onrush of gases and their sudden contacting of the catalyst, when the valve plate 68 is moved downwardly, comprises replacing portion of wall 39 with a membrane 49 such as a gas-permeable, liquid-impermeable sheet of a fluorinated vinyl resin. The membrane serves as an onrush preventing means by continuously minimizing the pressure differential between volumes 36 and 37. As a specific example of a membrane we may cite a fluorinated vinyl having an average pore size of 0.45 microns and a maximum pore size of 1.5 microns. Such a material is impermeable to water up to about 35 p.s.i.g., but is readily permeable to gases. It has a rated gas flow of about 6000 cc./minute/square centimeter at a pressure difference of 13.5 p.s.i. Suitable membranes may also be constructed from other synthetic resin materials, particularly from other fluorinated hydrocarbons, e.g., polytetrafluoroethylene and polyfluoroethylene. They may also be made of waterproof porous carbon or graphite, or waterproof porous ceramics, treated for example with acid-resistant waxes. The materials for these membranes are commercially available and the choice will be determined by the operating conditions encountered—e.g., pressures, flow rates, electrolyte, etc. It is of course, within the scope of this invention to use more than one of these membranes, if desired. Inasmuch as the membrane 49 is designed to achieve equilibration of the gas pressures in the recombination system chamber 37 with that in the battery chamber 36, it will usually not be necessary to use other onrush preventing means as in the arrangement shown in FIGS. 6–9. This is brought about by the fact that the pressure differential existing across the walls of the recombination chamber can be minimized by the proper choice of the membrane 49 so that the onrush of gases into the chamber 37 with the opening of the valve will be entirely prevented or at least reduced so as not to give rise to any explosions.

In using the recombination system of FIG. 2 the valve will be closed while the battery is being used and discharged, or on standby; and the valve will be opened when the battery is being charged. Thus during charging with the valve open, the hydrogen and oxygen gases resulting from electrolyte decomposition enter volume 37 at a temperature which normally approximates ambient temperature. It is desirable to maintain this near ambient temperature within volume 37 during recombination so that the elevated temperature obtaining within the flue member may establish the necessary temperature differential between these two distinct zones to set up convective currents through the flue. As these convective currents cause the gases to rise in the flue, they contact the catalytic surface and react to form water vapor. The water vapor is carried out through the upper fluid outlet means 61 into the cooler region of volume 37 where it condenses on the walls and returns by gravity into the battery through fluid passage 65. The unreacted gases are returned through the flue by reason of the circulating currents which are set up.

The recombination system modification of FIGS. 1–3 is particularly well suited for a cell or a battery which may be tipped or even turned over during its use, for during discharge the valve is closed and the catalyst is completely protected from the electrolyte. Since the valve is opened only during charging on a rack, it is possible always to control the orientation of the battery during the recombination process, that is, always to insure that the battery is in an upright position. In this position no liquid electrolyte can reach the catalyst.

FIG. 4 is a cross-sectional view through the narrow dimension of a battery incorporating the recombination system of this invention in a battery which would not be subjected to any great degree of tipping or which has a gelled electrolyte. The flue member 78 is located in the upper volume 36 of the battery above the electrolyte and does not have a chamber surrounding it as chamber 38 does in the embodiment of FIG. 2. To prevent electrolyte splashing, overlapping baffles 79 and 80 are interposed between the electrolyte level and the flue member 78. In the embodiment of FIG. 4 the flue member 78 comprises that passageway which is defined by walls 81, 82, 83, and 84, as well as two end walls which are not shown. The flue member may conveniently be made of a single piece of molded plastic which is resistant to the corrosive effects of the electrolyte. Although this flue member 78 may be constructed to employ the outer wall 21 of the battery and the cover 22 as flue walls, it is preferred that this not be done inasmuch as an undesirable amount of heat would be transferred from the gases in the flue to the ambient air through these outside walls. Thus, it is preferable to make the flue as a separate structure of a material which has a relatively low heat conductivity over the operating temperature range of the battery. Alternatively, it is possible to make the walls relatively thick or to use a layer of insulation 89 between the flue member and the battery wall and cover.

It will be seen that this flue has a lower gas inlet means 85 and an upper gas outlet means 86. In this modification, there is no means to close off the flow of fluid into the recombination system; and hence the flue member is open to the electrolyte decomposition gases at all times. This arrangement is permissible when the secondary battery in which it is incorporated is always maintained in an essentially upright position. If this were not so, electrolyte could possibly flow around the baffles 79 and 80 into the flue and contaminate the recombination member. In place of or in addition to the baffles, a gelled electrolyte may be used. The recombination member in this case is shown to be a heated wire 87, having lead wires 88 attached to its ends. The wire may be of platinum, a platinized metal, or other corrosion-resistant metal capable of being resistively heated.

FIG. 5 illustrates the use of a flue member enclosed within a recombustion system chamber which, like that of FIG. 4, is continuously open to the interior volume of the battery. In this figure like elements are identified by identical numerals as used in FIGS. 2–4.

The recombustion system chamber of FIG. 5 is comprised of a top mmeber 74 and four walls, only two of which, (75a and 75b) are shown. The flue member 50 is defined within the housing by the flue wall 76 which is integral with an inclined skirt wall 76a. Bottom member 77 completes the defining walls of the flue member built into the recombustion system chamber 38. Baffles 79 and 80, as in the case of FIG. 4, prevent any splashing of the electrolyte into the recombination chamber. As in the arrangement of FIG. 4, since the recombination chamber and the flue member are continuously open to the battery cells, it is not necessary to supply any means for preventing the sudden onrush of gases into the flue member.

FIG. 6 illustrates another embodiment of a flue member which is not contained within a surrounding chamber. This flue member, like the one in FIG. 4, is suitable for affixing to one or more walls and the cover of the battery if it is desired to conserve space. As in the case of the flue member of FIG. 4, that of FIG. 6 is formed of a series of walls (four of which are shown) which in practice could be made integral with each other in the form of a single molded piece. The bottom wall 84 may, if desired, have a gas-permeable liquid-impermeable membrane 49 to decrease the pressure differential between the battery interior and the interior of the flue member. This permits the rapid opening of the valve without experiencing too great onrush of the gases into the flue member. The flue of FIG. 6, however, has associated with it means for controlling the passage of gases through it. These means, which may be any suitable device for closing the fluid openings 85 and 86, are shown in FIG. 6 to be in the form of a slide valve. In order to provide a simple means for doing this, the flue housing has added to it a channel wall 90 which defines with flue housing wall 82, a channel suitable for vertically moving a slide valve 94. The channel wall 90 has openings 91 and 92 which correspond in location to opening 85 and 86 of the flue wall 82. As in the case of the modification of FIG. 1, the openings 85 and 86 will be usually closed during discharge; and this is done by means of the spring 97 which normally exerts an upward force against the force-applying member 96 to raise the ports 100 and 101 in the slide valve above openings 85 and 86. During charging operations, when the flue member is to be opened to the battery volume, the external part of the valve is placed in a socket 98 similar to socket 73 of FIG. 2; and the valve is held in the open position throughout charging by catches 99.

In order to prevent any explosion which might result from a too rapid contact with the catalyst system by the hydrogen and oxygen gases entering the flue member, there is provided flash suppressing means in addition to the gas-permeable, fluid-impermeable membrane 49. These flash suppressing means are shown in FIG. 6 to be glass beads 102 supported within the flue on a suitable coarse foraminous support 103. It will be appreciated that these flash suppressing means are, in fact, gas onrush preventing means; but, as will be noted, they may also serve an added function. In addition to being in the form of beads, such flash suppressing means may also, of course, take the form of rods, saddles, small tubes, gauze and the like. They may be constructed of any suitable material, the only requirement being that it is resistant to the electrolyte used and the atmosphere obtaining within the battery. They may be formed of glass, lead, plastics, ceramics, etc. It may be desirable that the flash suppressing means have hydrophobic surfaces. One way of accomplishing this is to coat their surfaces with a material such as polytetrafluorethylene.

In order to function efficiently, the flash-suppressing means should essentially totally surround the recombination-effecting means (e.g., the catalyst system of FIG. 6), and the depth of this surrounding material is dependent upon the dimension of the flash-suppressing means and the onrush protection required for any battery design. In the arrangement of FIG. 6 this is accomplished by supporting the beads 102 on a coarse foraminous support 103 made of a suitable foraminous material, i.e., resin coated wire screening.

It is desirable that the pressure drop, which is experienced by the gases across the flash-suppressing means, be kept at a minimum. This, therefore, dictates that the foraminous support 103 be relatively coarse and that the small individual forms serving as the flash-suppressing means be such as to define suitable passageways between them. The size and shape of these individual forms serving as flash-suppressing means will generally be that which optimizes their performance as flash suppressors and at the same time minimizes pressure drop. It has been found that beads which just pass through a standard 12-mesh screen (i.e., have a diameter of about 0.055 inch and form a one-fourth inch barrier around the catalyst achieve this compromise between minimizing pressure drop and maximizing flash suppression.

Although the mechanism by which beads, or other flash-suppressing forms, achieve the desired results is not completely understood, it has been observed that their presence around the catalyst (or heated wire) prevents any flashbacks which may occur if the difference in the pressures existing in the battery and in the recombination chamber is particularly great when the valve is opened. This is in addition to their ability to prevent onrush. It is believed that this added advantage gained in the use of flash-suppressing means may be a function of a combination of surface area of the beads (or other forms) and the size of the passages defined between them. It is therefore preferable that any flash-suppressors used as onrush-preventing means have a total surface area approximately equivalent to that generated by 12-mesh beads when surrounding the recombination-effecting means to a depth of at least about one-fourth inch with respect to all of its significantly active surfaces, and have gas passages of the same order of magnitude as generated by such 12-mesh beads.

Under some circumstances, it may be desirable to have the recombination system external of the battery, that is, affixed to a charge rack. For example, if the battery is to be used only periodically, such as the power source for a household lawnmower or an infrequently used power tool, it may not be desirable to incorporate the recombination system within the battery. In such a case, it may be attached to the charge rack in such a way that when the battery is installed in the charge rack the recombination system will be in workable engagement with the interior volume of the battery. Many modifications of such an arrangement are, of course, possible and the one illustrated in FIG. 7 is given as illustrative and not means to be limiting.

In the arrangement of FIG. 7 the battery cover 22 has a vertically-extending collar member 110 with external threads 111. When the battery is not on the charge rack, the opening 112 in the battery cover 22 is closed off and the battery maintained as a fluid-tight entity by means of a valve member 113, which contains a suitable sealing ring 114, engaging the inner wall of the battery cover 22. The necessary force to maintain the valve closed is supplied by spring 115 acting upwardly upon a closure disk 116 connected with the valve closing member 113 through a valve stem 117. When the battery is not on the charging rack, the disk 116 engages the walls of a comparably shaped opening 118 in the shoulder 119 affixed to collar 110, thus preventing the accumulation of dirt or dust in the well 120.

The external recombination system comprises a housing 121 arranged to be screwed down onto collar 110 and to form a fluid-tight seal therewith. Washers 122 and 123 are provided for this purpose. The housing is designed to have a shoulder 124 on the side opposite the flue member. The space over the shoulder is conveniently occupied by a plurality of cooling fins 125 mounted on housing 121 for the purpose of cooling volume 126 within the system. The flue member 127 is defined in part by the housing wall and in part by an inward extension 128 and a downward extension 129 thereof. A lower fluid inlet 130 and upper fluid outlet 131 are provided for the flue member. A foraminous support 132 holds loose catalyst pellets 133 in the lower part of the flue member.

The recombination system of FIG. 7 provides for controlling the rate of fluid flow into the system and hence provides the necessary protection against gas onrush.

It will be seen that in the system of FIG. 7, the valve member 113 is moved downwardly and the fluid passage opened through the application of pressure by pressure-applying member 135 on closure disk 116. This is done by turning screw 136 downwardly within the threaded extension 137 of the housing. O-ring 138 is provided to insure a fluid-tight seal.

In operation, the housing is screwed on the battery collar with the screw 136 in its topmost position to avoid a premature opening of the valve. When the housing is in place, screw 136 is slowly turned to engage disk 116 and open the valve. Thus the valve may be first just cracked to allow gas pressure to build up slowly in chamber 126 and to minimize a too rapid reaction between the hydrogen and oxygen. The procedure described is reversed in removing the battery from the charge rack.

FIG. 8 illustrates the application of the recombination system of this invention to a multi-celled battery designed to prevent any fluid communication between the electrolyte in the individual cells. Thus the recombination system of FIG. 8 could be used in place of the one shown in FIGS. 1 and 2. It provides separate subchambers 161 and 162 associated with separate cells 24 and 25, respectively. (In FIGS. 1, 2, and 8, like numbers refer to like elements.) A single flue member 163 in the apparatus of FIG. 8 serves both cells and is in communication with both subchambers 161 and 162. The recombination chamber in which the flue member is located is defined by four walls, two of which, 151 and 154, are shown in the cross section of FIG. 8. A flange 152 is provided for convenience in mounting the chamber to the battery cover 22. Left-hand cell 24 is directly in communication with subchamber 161 and right-hand cell 25 with subchamber 162 when the valve is open. These subchambers preferably have lower inclined portions such as section 153 which terminate in suitable lips 156 against which the valve member 68 seat. Other housing configurations may, of course, be used equally well. It will be appreciated that the housing which defines the enclosure may conveniently be made from a single piece of a molded plastic material which is capable of resisting the corrosive atmosphere obtaining within the battery.

This chamber housing of FIG. 8 also has a bottom piece 157 which is so shaped as to define a central groove 158 running lengthwise and a lip section 155 against which the valve members 68 seat. This groove is adapted to contact the top of the central divider 23 and, by forming a fluid seal with it, to isolate the electrolyte in the two cells. The two subchambers associated with the two cells have openings 159 and 160 and each has associated with it an externally actuatable valve of the same design as the embodiment of FIG. 2. Opening of the valve members provides two inlets 163 and 164 from the battery into the recombination system subchambers. The single flue member 163 is centrally positioned between the subchambers 161 and 162 and in this modification is shown as a four-walled chamber, two walls 164 and 165 of which are shown in cross-section. A top member 168 is affixed to the elastomeric gasket 64. The flue member is open on the bottom to provide fluid inlet means 170, and it has upper fluid outlet means shown as ports 171 and 172. Flash suppressing means 174 are supported on a foraminous support 175 and they surround the catalyst system which is that which was described for FIG. 2.

Figure 9:
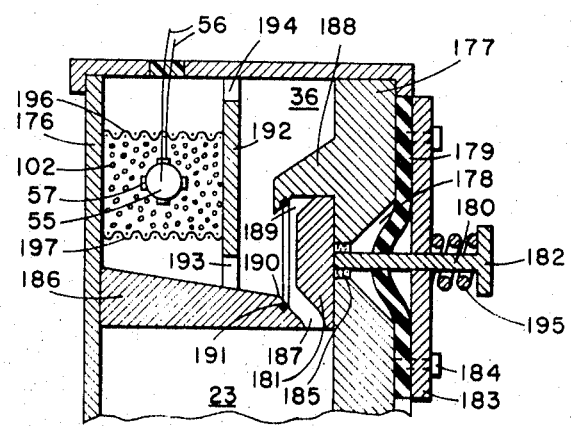
FIG. 9 is a cross section of a modification of FIG. 2.

FIG. 9 illustrates another arrangement which provides for the use of a single recombination system chamber in conjunction with two cells which are divided by a cell divider 23. It also illustrates the use of an externally actuated valve which is located in the side of the battery rather than above the cover member as previously illustrated in FIGS. 1, 2, 6, and 8. This arrangement requires some modification in one of the battery side walls. That wall which may be considered to be the front wall 176 is not modified; but the back wall 177 is made relatively thick and has a recess 178 adapted to receive a portion of an elastomeric gasket 179 as it moves to seal the valve rod 180. The valve rod has a closure member 181 within the battery housing and a pressure-applying member 182 external of the housing. The gasket and rod are held in place by a plate 183 and screws 184. A bushing 185 (made for example of polytetrafluoroethylene) completes the valve means assembly. Attached to wall 176 is a contoured bottom member 186 which has ports 187, one of which leads into each of the cells which are on either side of cell divider 23. Attached to the inner wall of the battery housing wall 177 is another contoured member 188 which, with the bottom member 186, defines a volume 189 in which the valve member 181 moves laterally to make a fluid-tight cell. The seal is made with the inclined wall 190 of member 188 and, a suitable sealing member such as O-ring 191 is provided. The flue member within the recombination system chamber is defined by wall 176, the contoured member 186 and a flue wall 192. The latter contains the inlet means 193 and the outlet means 194.

In the modifications shown in FIG. 9 a spring 195 is used to maintain the valve in its open position during charging, the condition which is illustrated in FIG. 9. A socket smilar to the one shown in FIG. 2 may be used to close the valve during discharging. Within the flue member volume there are an upper foraminous retaining plate 196 and a lower foraminous supporting plate 197 defining between them a volume which contains suitable flush-suppressing means such as beads 102.

The invention may be further illustrated with reference to the following examples which are meant to be illustrative and not limiting. A standard two-cell lead-sulfuric acid battery was used and a flue member was installed above the electrolyte level such that it could receive gases from both cells. The flue member was constructed as shown in FIG. 5. The recombination-effecting means was a catalytic system as described in detail in conjunction with FIG. 5. That is, the heating element was a carbon resistor rod to which a number of small pellets of palladinized alumina had been affixed with an epoxy resin adhesive.

The two-cell battery had the following operational characteristics. 4 volts, 9 to 10 ampere hours nominal discharge. A cycle consisted of a ten hour discharge period (at 0.95 amperes) followed by a fourteen-hour charge period. Every sixth cycle the charge period was increased to 38 hours. During charge periods of the cycle the resistor element was electrically heated which in turn heated the catalyst pellets. During a period of 5040 hours of this cycling (30 weeks) the pressure in the test battery reached 55 p.s.i.g. upon several occasions and the safety release valve opened. Total gas losses during the 30-week period were about 5000 cc. (STP), an amount which was not sufficient to affect significantly the electrolyte level. Thus, in effect, the test battery remained completely sealed over this test period of 30 weeks. There was, furthermore, no indication that the test period could not be extended.

A similar battery was equipped with the same catalyst system and a flue member which was continuously in communication with the interior of the battery was placed around it. During charging the pressure within the battery was measured. The flue member was then substituted by an enclosure which was of the same size but which had holes only in the two sides and directly opposite from each other. The pressure was also measured for this set up. It was found that the pressure under steady-state conditions for the battery containing the flue member was only about 56% of the pressure under steady-state conditions for the battery without the flue member. This, of course, means that a greater quantity of the gases was being reacted when the flue member was used than when it was not used.

The use of various flash-suppression means was successfully illustrated in a mock-up device. A chamber of about 1500 cc. in volume was charged with up to 25 p.s.i.g. of oxygen. This chamber was separated by means of a solenoid valve from a small adjacent chamber having a volume of 35 cc. The smaller chamber contained a recombination device such as shown in FIG. 2 (catalyst pellets on a carbon rod) and was preloaded prior to each test with hydrogen at a selected pressure. The flash-suppressing means was arranged around the recombination-effecting means within the smaller chamber so as to fill all of the space between the catalyst pellets and the surrounding chamber wall and to extend between about one-fourth and one-half inch above and below the pellets (see FIG. 9 for example). Typical flash-suppressing means used were 80-mesh alumina powder, 16-mesh lead shot and 12- to 50-mesh glass beads.

Flash suppression was evaluated by opening the solenoid valve to permit the oxygen suddenly to rush into the smaller, hydrogen-filled chamber. When these flash-suppressing means surrounded the catalyst system to a depth of at least one-fourth inch they were all effective in preventing a destructive explosion when the pressure differential between the two chambers prior to the opening of the valve was as high as 10 p.s.i.; and the finer materials (alumina and glass) were effective for pressure differentials up to at least 40 p.s.i.

The use of a gas-permeable, water-impermeable membrane was evaluated by constructing a simulated system. This consisted of one chamber which contained the catalyst and another chamber which was a gas generating space simulating the interior of a battery. The chambers were connected by a valved fluid conduit which had in it a water-repellant micro filter film which was rated to pass 6.6 liters of gas per minute over an area of one square centimeter at a pressure of 13.5 p.s.i. When the valve was opened and the gases were allowed to pass through the membrane it was found that pressure differences up to about 20 p.s.i. were essentially instantaneously equalized across the membrane.

By achieving efficient recombination of the hydrogen and oxygen gases the recombination system of this invention provides an inexpensive means for making a sealed secondary or storage battery. This in turn makes such batteries available as power sources for many devices in which they could not heretofore be used.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A sealed secondary battery construction characterized by maintenance-free operation throughout extended battery charge and discharge cycles during which hydrogen and oxygen gases are evolved, said battery construction comprising a container having sealed cover means, positive and negative plate means and separator plate means received in the container, a body of electrolyte overlying the plate means at a level occurring in spaced relation to the sealed cover means thereby to define a gas retaining volume in which the said evolved hydrogen and oxygen gases are confined, catalyst means for effecting exothermic recombination of hydrogen and oxygen gases with evolution of heat and formation of water vapor, said catalyst means being supported in the said gas retaining volume above the level of the electrolyte in a position to be exposed to the hydrogen and oxygen gases evolved during the said battery charge and discharge cycles, a tubular flue member vertically disposed in the gas retaining volume for controlling a flow of gases around the catalyst, the lower portion of the tubular flue member enclosing the catalyst in closely spaced relation thereto and arranged to be warmed by heat from the catalyst and from the recombination of hydrogen and oxygen induced by the catalyst, said tubular flue being formed with a gas inlet opening located in its lower portion immediately below the catalyst and an outlet opening located farther away and above the catalyst, said gas inlet opening providing means to return condensed water into the battery electrolyte, and said lower portion of the tubular flue member communicating with the gas retaining volume and operative when warmed by heat from the catalyst and recombination of evolved gases to provide circulation of gases around the catalyst by means of convection currents induced from relatively low density warm evolved gases next to the warm surfaces of the flue moving upwardly in response to thermal and density gradients existing between the relatively low density warm gases and relatively high density cooler gases which are farther away from the warmed surfaces of the flue.

2. A structure according to claim 1 in which the catalyst means includes an externally operated heating device.

3. A structure according to claim 1 in which the gas conducting flue includes an outer enclosure body and a valve mechanism for opening and closing an aperture formed in the enclosure body.

References Cited

UNITED STATES PATENTS

| | | | |
|---|---|---|---|
| 2,879,146 | 3/1959 | McElroy et al. | 23—288 |
| 3,000,707 | 9/1961 | Barstow. | |
| 3,348,923 | 10/1967 | Demarest | 23—288 |
| 3,355,258 | 11/1967 | Thomas. | |
| 3,356,533 | 12/1967 | Carson | 136—6 |
| 1,694,530 | 12/1928 | Davis | 136—179 |
| 2,911,986 | 11/1959 | Riggs et al. | 136—78 |
| 3,038,954 | 6/1962 | Pattison et al. | 136—179 |
| 3,287,174 | 11/1966 | Hennigan et al. | 136—179 |
| 3,348,923 | 10/1967 | Demarest | 23—288 |

FOREIGN PATENTS

| | | |
|---|---|---|
| 303,799 | 4/1930 | Great Britain. |
| 339,824 | 12/1930 | Great Britain. |

WINSTON A. DOUGLAS, Primary Examiner

C. F. LEFEVOUR, Assistant Examiner

U.S. Cl. X.R.

136—179